United States Patent
Fukashiro et al.

(10) Patent No.: US 11,888,427 B2
(45) Date of Patent: Jan. 30, 2024

(54) MOTOR CONTROL DEVICE, HYDRAULIC PRESSURE GENERATION DEVICE, MOTOR CONTROL METHOD, AND COMPUTER-READABLE RECORDING MEDIUM

(71) Applicant: MITSUBA Corporation, Gunma (JP)

(72) Inventors: Kota Fukashiro, Gunma (JP); Miya Yamada, Gunma (JP)

(73) Assignee: MITSUBA Corporation, Gunma (JP)

( * ) Notice: Subject to any disclaimer, the term of this patent is extended or adjusted under 35 U.S.C. 154(b) by 272 days.

(21) Appl. No.: 17/541,200

(22) Filed: Dec. 2, 2021

(65) Prior Publication Data

US 2022/0178364 A1 Jun. 9, 2022

(30) Foreign Application Priority Data

Dec. 3, 2020 (JP) ................. 2020-201088

(51) Int. Cl.
| | |
|---|---|
| *H02P 6/18* | (2016.01) |
| *H02P 6/06* | (2006.01) |
| *F04B 49/20* | (2006.01) |
| *F04B 49/06* | (2006.01) |
| *H02P 6/28* | (2016.01) |
| *F04B 17/03* | (2006.01) |

(52) U.S. Cl.
CPC ............ *H02P 6/06* (2013.01); *F04B 49/065* (2013.01); *F04B 49/20* (2013.01); *H02P 6/28* (2016.02); *F04B 17/03* (2013.01); *F04B 2203/0201* (2013.01); *F04B 2203/0209* (2013.01)

(58) Field of Classification Search
CPC .............. H02P 6/06; H02P 6/28; F04B 49/20
See application file for complete search history.

(56) References Cited

U.S. PATENT DOCUMENTS

| 6,208,102 B1* | 3/2001 | Kikuchi | E05F 15/40 49/138 |
|---|---|---|---|
| 2016/0043679 A1* | 2/2016 | Shahi | F04D 27/004 417/42 |
| 2019/0068092 A1* | 2/2019 | Kaidu | H02P 6/157 |
| 2019/0190414 A1* | 6/2019 | Devos | H02P 25/024 |

FOREIGN PATENT DOCUMENTS

JP H08251967 9/1996

\* cited by examiner

*Primary Examiner* — Muhammad S Islam
(74) *Attorney, Agent, or Firm* — JCIPRNET

(57) ABSTRACT

A motor control device according to the disclosure includes: a current control part, performing current control for rotating a motor from a stop state; a rotation speed calculation part, calculating an actual rotation speed of the motor; an acquisition part, acquiring a target rotation speed of the motor; a speed control part, performing speed control of the motor, so that the actual rotation speed of the motor becomes the target rotation speed; and a correction part, at a time when a current control state is transitioned to a speed control, correcting the target rotation speed based on a relation between the actual rotation speed and the target rotation speed. When the target rotation speed is corrected, the speed control part performs the speed control so that the actual rotation speed becomes the target rotation speed corrected by the correction part.

10 Claims, 8 Drawing Sheets

MOTOR CONTROL DEVICE, HYDRAULIC PRESSURE GENERATION DEVICE, MOTOR CONTROL METHOD, AND COMPUTER-READABLE RECORDING MEDIUM

CROSS-REFERENCE TO RELATED APPLICATION

This application claims the priority benefit of Japan application serial no. 2020-201088, filed on Dec. 3, 2020. The entirety of the above-mentioned patent application is hereby incorporated by reference herein and made a part of this specification.

BACKGROUND

Technical Field

The disclosure relates to a motor control device, a motor driving system, a hydraulic pressure generation device, a motor control method, and a computer-readable recording medium.

Description of Related Art

Technologies for preventing the actual rotation of a shaft of an induction motor from excessively exceeding a set rotation speed set in advance are known (see Patent Document 1, for example).

PRIOR ART DOCUMENT

Patent Document(s)

[Patent Document 1] Japanese Unexamined Patent Application Publication No. H08-251967

In the case of performing current control to rotate a motor from a stop state (e.g., current control according to a maximum current value), depending on the load of the motor at this time, the way in which the rotation speed of the motor increases may differ. In such case, when the control state is uniformly transitioned immediately from the current control state to rotation speed control for matching the rotation speed of the motor to a target rotation speed, the rotation speed may decrease drastically. In such case, there is a concern that a desired rotation state of the motor may not be realized owing to the load.

SUMMARY

According to an aspect of the disclosure, a motor control device is provided. The motor control device includes: a current control part, performing current control for rotating a motor from a stop state; a rotation speed calculation part, calculating an actual rotation speed of the motor; an acquisition part, acquiring a target rotation speed, which is a target value relating a rotation speed of the motor; a speed control part, performing speed control of the motor, so that the actual rotation speed of the motor calculated by the rotation speed calculation part becomes the target rotation speed acquired by the acquisition part; and a correction part, at a time of a transition from a current control state by the current control part to the speed control performed by the speed control part, correcting the target rotation speed acquired by the acquisition part based on a relation between the actual rotation speed of the motor calculated by the rotation speed calculation part and the target rotation speed acquired by the acquisition part. In a case where the target rotation speed acquired by the acquisition part is corrected by the correction part, the speed control part performs the speed control, so that the actual rotation speed of the motor calculated by the rotation speed calculation part becomes the target rotation speed corrected by the correction part.

Another aspect of the disclosure provides a hydraulic pressure generation device, including: a hydraulic pressure pump; a motor, driving the hydraulic pressure pump; and a motor control device, controlling the motor. The motor control device includes: a current control part, performing current control for rotating the motor from a stop state; a rotation speed calculation part, calculating an actual rotation speed of the motor; an acquisition part, acquiring a target rotation speed, which is a target value relating a rotation speed of the motor; a speed control part, performing speed control of the motor, so that the actual rotation speed of the motor calculated by the rotation speed calculation part becomes the target rotation speed acquired by the acquisition part; and a correction part, at a time of a transition from a current control state by the current control part to the speed control performed by the speed control part, correcting the target rotation speed acquired by the acquisition part based on a relation between the actual rotation speed of the motor calculated by the rotation speed calculation part and the target rotation speed acquired by the acquisition part. In a case where the target rotation speed acquired by the acquisition part is corrected by the correction part, the speed control part performs the speed control, so that the actual rotation speed of the motor calculated by the rotation speed calculation part becomes the target rotation speed corrected by the correction part.

Another aspect of the disclosure includes: a motor control method, including: a current control step of performing current control for rotating a motor from a stop state; a rotation speed calculation step of calculating an actual rotation speed of the motor; an acquisition step of acquiring a target rotation speed, which is a target value relating a rotation speed of the motor; a speed control step of performing speed control of the motor, so that the actual rotation speed of the motor calculated in the rotation speed calculation step becomes the target rotation speed acquired in the acquisition step; and a correction step of correcting, at a time of a transition from a current control state in the current control step to the speed control performed in the speed control step, the target rotation speed acquired in the acquisition step based on a relation between the actual rotation speed of the motor calculated in the rotation speed calculation step and the target rotation speed acquired in the acquisition step. In the speed control step, in a case where the target rotation speed acquired in the acquisition step is corrected by the correction step, the speed control is performed, so that the actual rotation speed of the motor calculated in the rotation speed calculation step becomes the target rotation speed corrected in the correction step.

Another aspect of the disclosure provides a computer-readable recording medium, storing a motor control program causing a computer to execute: a current control process of performing current control for rotating a motor from a stop state; a rotation speed calculation process of calculating an actual rotation speed of the motor; an acquisition process acquiring a target rotation speed, which is a target value relating a rotation speed of the motor; a speed control process of performing speed control of the motor, so that the actual rotation speed of the motor calculated in the rotation speed calculation process becomes the target rotation speed acquired in the acquisition process; and a correction process of correcting, at a time of a transition from a current control state performed in the current control process to the speed control performed in the speed control process, the target rotation speed acquired in the acquisition process based on a relation between the actual rotation speed of the motor calculated in the rotation speed calculation process and the target rotation speed acquired in the acquisition process. In the speed control process, in a case where the target rotation speed acquired in the acquisition process is corrected by the correction process, the speed control is performed, so that the actual rotation speed of the motor calculated in the rotation speed calculation process becomes the target rotation speed corrected in the correction process.

DESCRIPTION OF THE EMBODIMENTS

The disclosure provides a motor control device, a motor driving system, a hydraulic pressure generation device, a motor control method, and a computer-readable recording medium.

According to the disclosure, it is possible to suppress the drastic decrease in the rotation speed of the motor occurring at the time when the current control state is transitioned to the speed control state.

In the following, an embodiment of the disclosure will be described with reference to the drawings.

Figure 1:
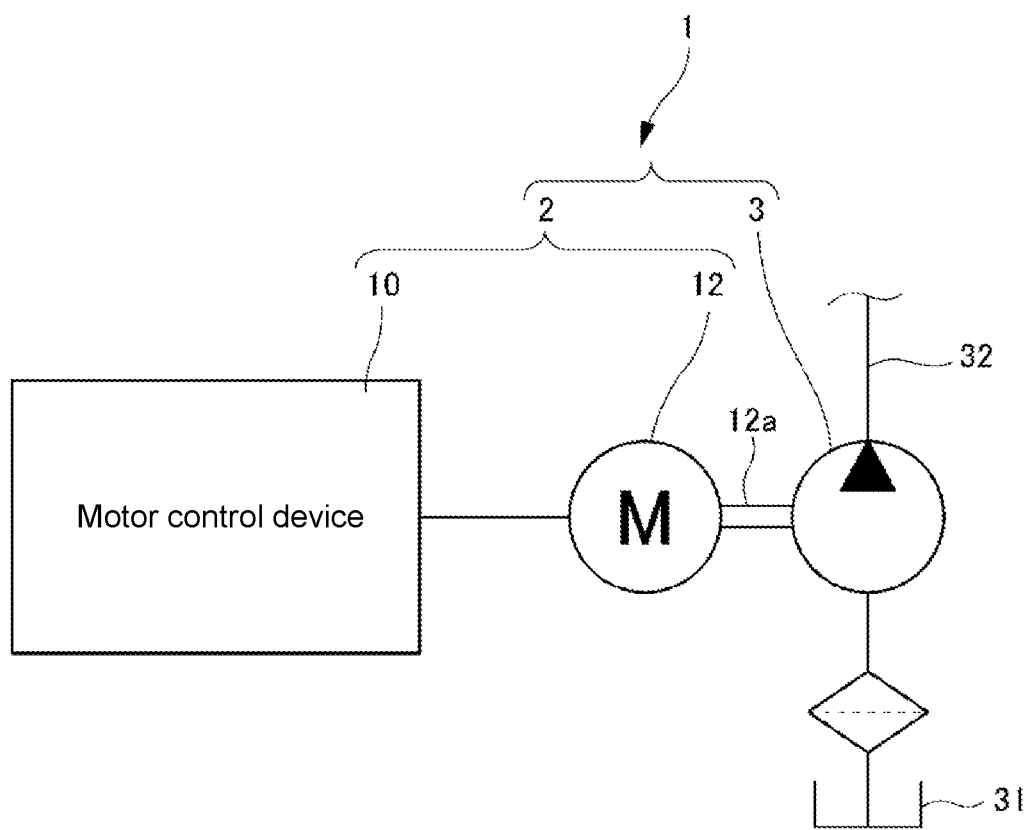
FIG. 1 is a schematic diagram illustrating an embodiment of a hydraulic pressure generation device.

FIG. 1 is a schematic diagram illustrating an embodiment of a hydraulic pressure generation device 10.

The hydraulic pressure generation device 1 is a device which generates a hydraulic pressure and suitable to be mounted in a vehicle. As shown in FIG. 1, the hydraulic pressure generation device 1 includes a motor driving system 2 and a hydraulic pressure pump 3.

The motor driving system 2 includes a motor control device 10 and a motor 12.

The motor control device 10 controls the motor 12 to control the hydraulic pressure pump 3. The motor control device 10 is, for example, a processing device including a micro-computer, for example. The hardware configuration of the motor control device 10 is arbitrary, and can be the same as a vehicle-mounted electronic control unit (ECU).

In the motor 12, an output shaft 12a functions as a driving shaft of the hydraulic pressure pump 3. While the motor 12 is a three-phase brushless motor, the number of phases is not limited thereto, and the detailed configuration is arbitrary. The motor 12 may be directly connected to the hydraulic pressure pump 3, and may also be connected to the hydraulic pressure pump 3 via another mechanism (not shown).

The hydraulic pressure pump 3 is an electric pump, and, when driven, sucks oil in a tank 31 and discharges the oil to a supply passage 32.

Accordingly, the hydraulic pressure generation device 1 according to the embodiment generates a hydraulic pressure by driving the hydraulic pressure pump 3 via the motor driving system 2. The hydraulic pressure generated by the hydraulic pressure pump 3 (i.e., the oil discharged from the hydraulic pressure pump 3) can be used in driving of an actuator, cooling of heat generating parts of various vehicle-mounted electronic apparatuses, lubrication of movable parts, etc.

Figure 2:
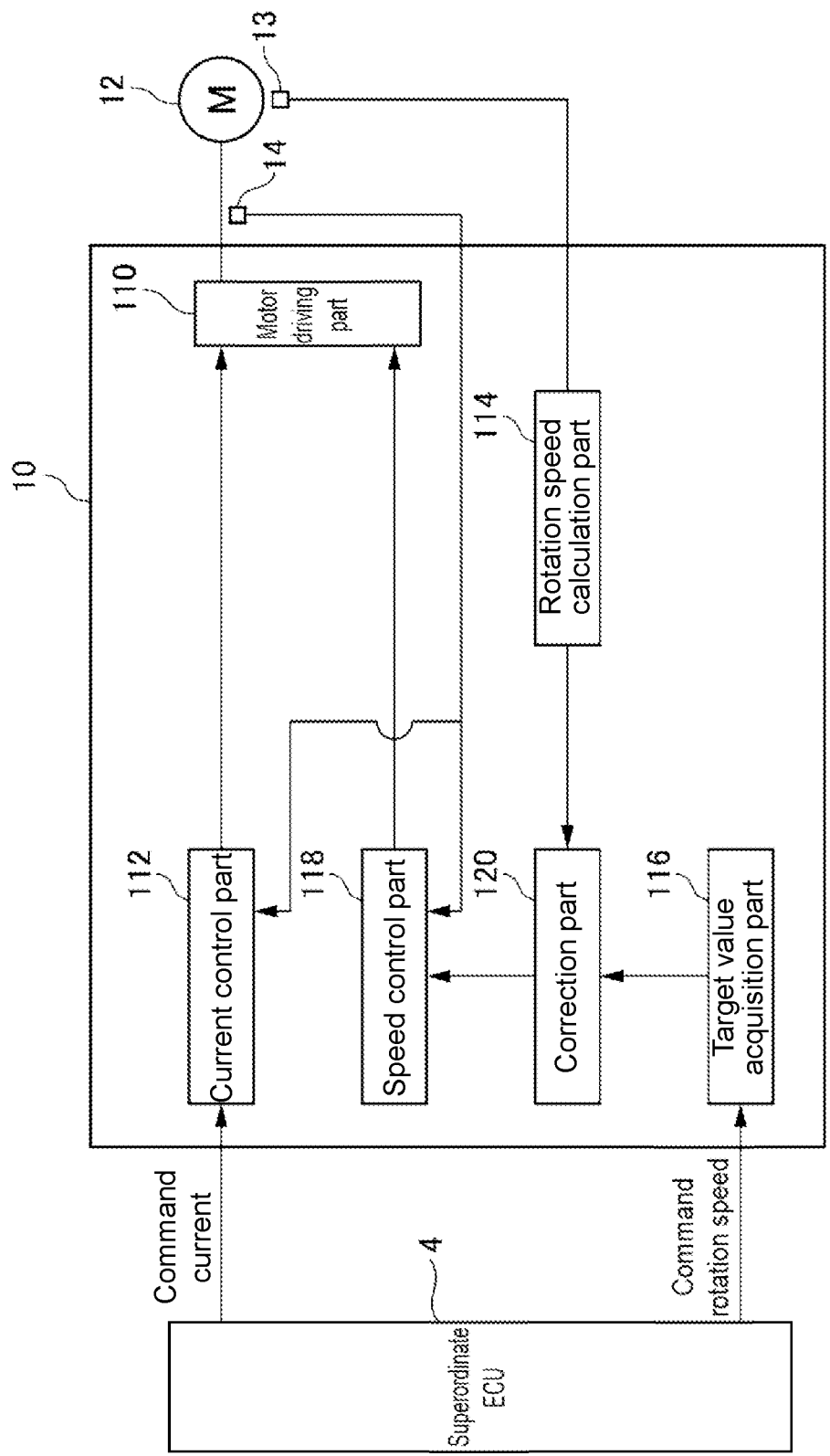
FIG. 2 is a functional block diagram schematically illustrating an embodiment of a motor control device.

FIG. 2 is a functional block diagram schematically illustrating an embodiment of the motor control device 10. In FIG. 2, as related configurations, a superordinate ECU 4 is shown together with the motor 12 and a rotation sensor 13 and a current sensor 14.

The superordinate ECU 4 is an example of a control device superordinate to the motor control device 10, and provides various commands to the motor control device 10. The rotation sensor 13 supplies an electrical signal corresponding to the rotation speed of the motor 12, as sensor information, to the motor control device 10. The current sensor 14 detects a phase current flowing through each phase of the motor 12.

The motor control device 10, as shown in FIG. 2, includes a motor driving part 110, a current control part 112, a rotation speed calculation part 114, a target value acquisition part 116 (an example of an acquisition part), a speed acquisition part 118, and a correction part 120.

The motor driving part 110 includes, for example, an integrated circuit (IC) and an inverter, the inverter (not shown) is controlled based on a drive duty instructed from the current control part 112 or the speed control part 118, and a driving current (e.g., three-phase driving current) corresponding to the drive duty is supplied to the motor 12.

Figure 3:
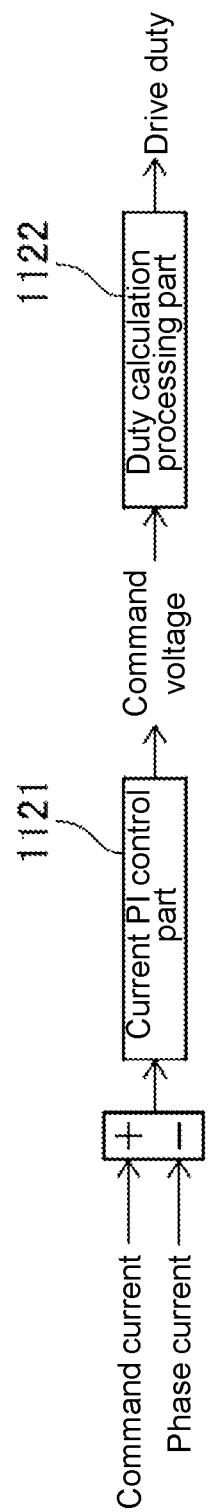
FIG. 3 is a schematic block diagram illustrating current control realized by a current control part.

The current control part 112 performs current control for rotating the motor 12 from a stop state. That is, the current control part 112 performs current control for starting the motor 12. The current control according to the current control part 112 can be realized by the configuration shown in FIG. 3, for example. FIG. 3 is a schematic block diagram illustrating current control realized by the current control part 112. In the example shown in FIG. 3, in the current control part 112, a command voltage is calculated by a current PI control part 1121 based on a deviation between a command current supplied from the superordinate ECU 4 and a phase current (detected value) from the current sensor 14. Then, in a duty calculation process part 1122, based on the command voltage, the drive duty (represented as "Duty" in FIG. 3, etc.) supplied to the motor driving part 110 is calculated. In another example, the drive duty may also be a fixed value which is constantly at maximum (e.g., 100%). In this case, a maximum driving current within a variable range is applied to the motor 12.

The rotation speed calculation part 114 calculates the rotation speed (actual rotation speed) of the motor 12 based on the sensor information from the rotation sensor 13. In another example, the rotation speed calculation part 114 may also calculate (estimate) the actual rotation speed of the motor 12 based on a parameter such as the driving current.

Figure 4:
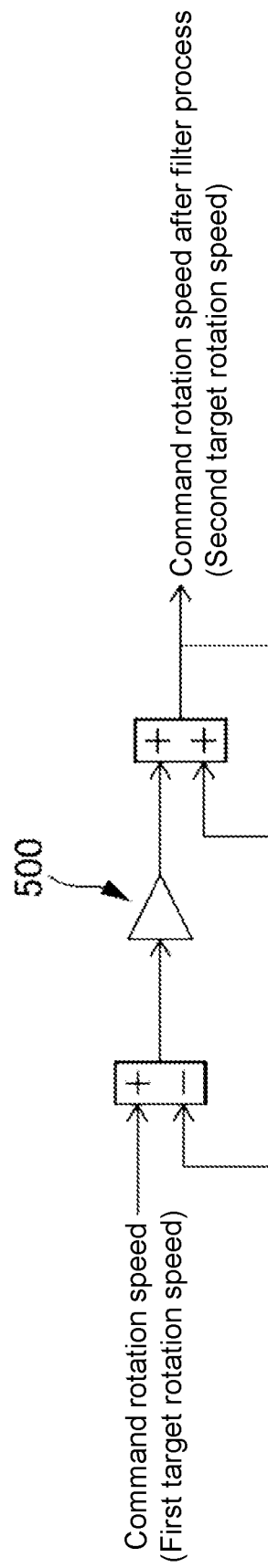
FIG. 4 is a schematic block diagram illustrating a configuration of acquiring a target rotation speed by a target value acquisition part.

The target value acquisition part 116 acquires a target rotation speed, which is a target value relating to the rotation speed of the motor 12. The target value acquisition part 116 acquires (calculates) the target rotation speed based on a command rotation speed (an example of the command value) from the superordinate ECU 4. For example, the target value acquisition part 116 may also use the command rotation speed from the superordinate ECU 4 as the target rotation speed. Or, the acquisition of the target rotation speed according to the target value acquisition part 116 can be realized by using the configuration shown in FIG. 4. FIG. 4 is a schematic block diagram illustrating a configuration of acquiring a target rotation speed by the target value acquisition part 116. In the example shown in FIG. 4, in the target value acquisition part 116, a difference between the command rotation speed from the superordinate ECU 4 and a command rotation speed after a filter process is calculated, and the difference is multiplied by a filter gain (see an arrow 500 of FIG. 4). Then, by adding up the difference multiplied by the filter gain and the command rotation speed after the filter process, the command rotation speed after the filter process is acquired as the target rotation speed. That is, by filtering the command rotation speed, the command rotation speed after the filter process is acquired as the target rotation speed.

In the embodiment, as an example, the target value acquisition part 116 acquires two types of target rotation speeds. That is, the target value acquisition part 116 acquires the command rotation speed from the superordinate ECU 4 as a first target rotation speed, and acquires the command rotation speed after the filter process as a second target rotation speed. In the following, except for the case where the first target rotation speed and the second target rotation speed are specifically distinguished, these rotation speeds are generally referred to as "target rotation speed".

Figure 5:
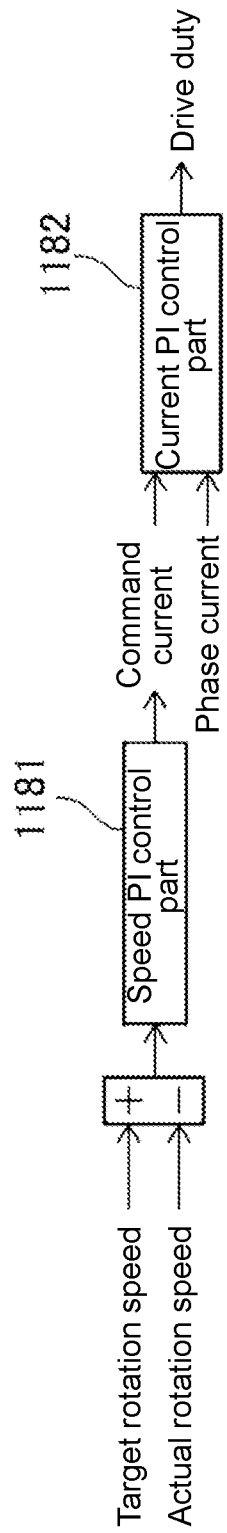
FIG. 5 is a schematic block diagram illustrating speed control realized by a speed control part.

The speed control part 118 performs speed control on the motor 12, so that the actual rotation speed of the motor 12 calculated by the rotation speed calculation part 114 becomes the target rotation speed acquired by the target value acquisition part 116. The speed control performed by the speed control part 118 can be realized by the configuration shown in FIG. 5, for example. FIG. 5 is a schematic block diagram illustrating the speed control realized by the speed control part 118. In the example shown in FIG. 5, in the speed control part 118, the command current is calculated by a speed PI control part 1181 based on a deviation between the target rotation speed acquired by the target value acquisition part 116 and the actual rotation speed calculated by the rotation speed calculation part 114. Then, based on the deviation between the command current and the phase current (detected value) from the current sensor 14, the command voltage is calculated by a current PI control part 1182. Then, by executing a duty calculation process based on the command voltage, the drive duty supplied to the motor driving part 110 is calculated.

At the time when the motor 12 starts, the speed control performed by the speed control part 118 is executed after the current control performed by the current control part 112. In the embodiment, the control state of the motor control device 10 selectively includes the speed control state by the speed control part 118 and the current control state by the current control part 112, and the transition from the current control at the time when the motor 12 is started to the speed control state is realized in the case where a predetermined transition condition is satisfied. The predetermined transition condition is satisfied in the case where the actual rotation speed calculated by the rotation speed calculation part 114 exceeds a threshold, for example. Or, the predetermined transition condition may be satisfied in the case where the current control state by the current control part 112 lasts for a predetermined time or more. Or, the predetermined transition condition may be satisfied in the case where the rotation amount of the motor 12 exceeds a threshold (e.g., one rotation).

In the embodiment, as an example, the speed control part 118 performs the speed control of the motor 12 based on the second target rotation speed after the transition from the current control to the speed control state is completed. In addition, in the embodiment, at the time when the current control is transitioned to the speed control state, in the case where the second target rotation speed is corrected by the correction part 120, the speed control part 118 performs the speed control on the motor 12 based on the corrected second target rotation speed. That is, the speed control part 118 performs the speed control on the motor 12, so that the actual rotation speed of the motor 12 calculated by the rotation speed calculation part 114 becomes the second target rotation speed corrected by the correction part 120. Meanwhile, at the time when the current control is transitioned to the speed control state, in the case where the second target rotation speed is not corrected by the correction part 120, the speed control part 118 performs the speed control on the motor 12 based on the first target rotation speed.

At the time the current control state by the current control part 112 is transitioned to the speed control performed by the speed control part 118, the correction part 120 corrects the second target rotation speed acquired by the target value acquisition part 116 based on a relation between the actual rotation speed of the motor 12 calculated by the rotation speed calculation part 114 and the target rotation speed (in the embodiment, as an example, the first target rotation speed) acquired by the target value acquisition part 116. In the following, at the time when the current control state by the current control part 112 is transitioned to the speed control performed by the speed control part 118, the correction process with respect to the second target rotation speed executed by the correction part 120 is simply referred to as "correction process". In another example, equivalently, instead of correcting the second target rotation speed acquired by the target value acquisition part 116, the command rotation speed supplied from the superordinate ECU 4 may also be corrected.

The correction process performed by the correction part 120 is suitable to be realized as follows, for example. In the case where the first target rotation speed acquired by the target value acquisition part 116 is lower than the actual rotation speed of the motor 12 calculated by the rotation speed calculation part 114, the correction part 120 corrects the second target rotation speed acquired by the target value acquisition part 116 toward the actual rotation speed. That is, the second target rotation speed approaches the actual rotation speed.

In the embodiment, the correction process performed by the correction part 120 is a process which corrects the second target rotation speed to be substantially the same as the actual rotation speed. Here, "being substantially the same" refers to tolerating an error of 10% of the actual rotation speed, for example.

Figure 6:
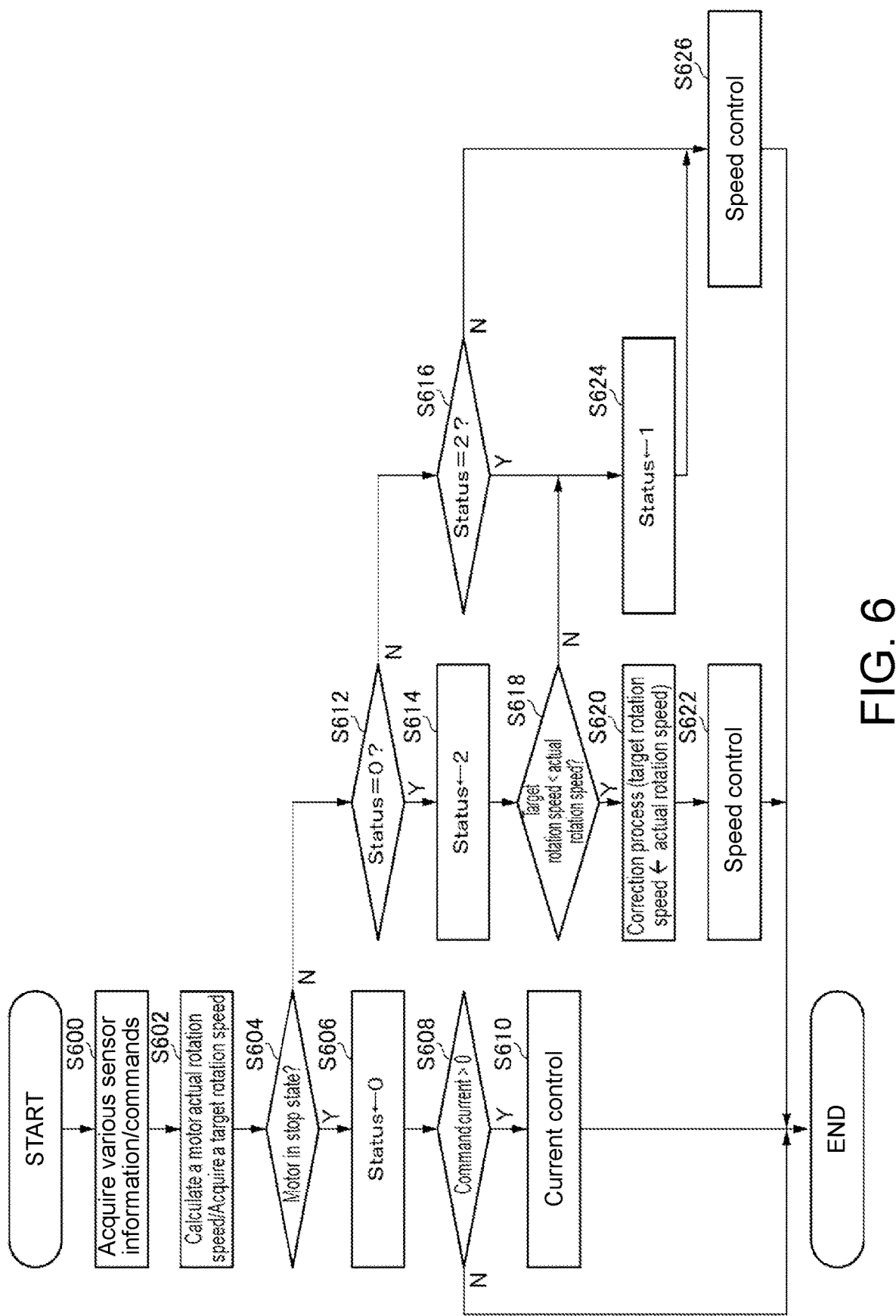
FIG. 6 is a diagram illustrating an example of a process flow executed by a motor control device according to the embodiment.

FIG. 6 illustrates an example of a process flow executed by the motor control device 10 according to the embodiment. In FIG. 6, the motor control device 10 has Status representing three states, where Status=0 represents the current control state, Status=1 represents the speed control state, and Status=2 represents a transition state from the current control state by the current control part 112 to the speed control performed by the speed control part 118.

The motor control device 10 acquires various sensor information (sensor information from the rotation sensor 13 and the current sensor 14) of a current cycle, and acquires various commands from the superordinate ECU 4 (Step S600).

Then, the motor control device 10 calculates the actual rotation speed of the motor control device 10 based on the sensor information and acquires the target rotation speed (first and second target rotation speeds) (Step S602). Then, the motor control device 10 determines whether the motor 12 is in the stop state (Step S604). Whether the motor 12 is in the stop state can be determined by, for example, determining whether the actual rotation speed of the motor 12 calculated by the rotation speed calculation part 114 is 0. In the case where the motor 12 is in the stop state ("YES" in Step S604), the motor control device 10 sets Status=0 (Step S606). The initial value of Status may be 0.

The motor control device 10 determines whether the command current from the superordinate ECU 4 is greater than 0 (Step S608). That is, the motor control device 10 determines whether a driving command of the motor 12 from the superordinate ECU 4 is generated. In the case where the command current is greater than 0 ("YES" in Step S608), the current control is executed (started) (Step S610). In the case where the current command is 0 ("NO" in Step S608), the process for the current cycle ends.

Meanwhile, in the case where the motor 12 is not in the stop state ("NO" in Step S604), the motor control device 10 determines whether Status=0 (Step S612), and when Status=0 ("YES" in Step S612), the motor control device 10 determines that the transition condition is satisfied and sets Status=2 (Step S614), and the flow proceeds to Step S618. Comparatively, when Status is not equal to 0, ("NO" in Step S612), the motor control device 10 determines whether Status=2 (Step S616), and when Status=2 ("YES" in Step S616), the flow proceeds to Step S626 via Step S624, and when Status is not equal to 2 ("NO" in Step S616), that is, when Status=1, the flow proceeds to Step S626 and executes the speed control (Step S626). In this case, speed control is executed based on the second target rotation speed acquired by the target value acquisition part 116.

In Step S618, the motor control device 10 determines whether the first target rotation speed is lower than the actual rotation speed. At this time, the motor control device 10 may determine whether the first target rotation speed is lower than the actual rotation speed by a predetermined value or more. In the case where the first target rotation speed is lower than the actual rotation speed ("YES" in Step S618), a correction process for matching the second target rotation speed to the actual rotation speed is performed (Step S620). Then, the motor control speed 10 executes the speed control based on the corrected second target rotation speed (=actual rotation speed) (Step S622). Meanwhile, in the case where the first target rotation speed is not lower than the actual rotation speed ("NO" in Step S618), Status=1 is set (Step S624), and the speed control is executed (Step S626). In this case, the second target rotation speed acquired by the target value acquisition part 116 is not corrected by the correction part 120. In such case, the speed control is executed based on the first target rotation speed acquired by the target value acquisition part 116.

By doing so, according to the process shown in FIG. 6, at the time when the current control state is transitioned to the speed control state, due to the correction process of Step S620, the rotation speed of the motor 12 can be prevented from decreasing drastically. In addition, by executing the process shown in FIG. 6 at each predetermined cycle, Status=1 or 2 can be set based on a relation with various parameters changing dynamically in each predetermined cycle (e.g., the target rotation speed acquired by the target value acquisition part 116, and the actual rotation speed calculated by the rotation speed calculation part 114). Accordingly, the correction process performed by the correction part 120 can be realized over a suitable period.

Figure 7:
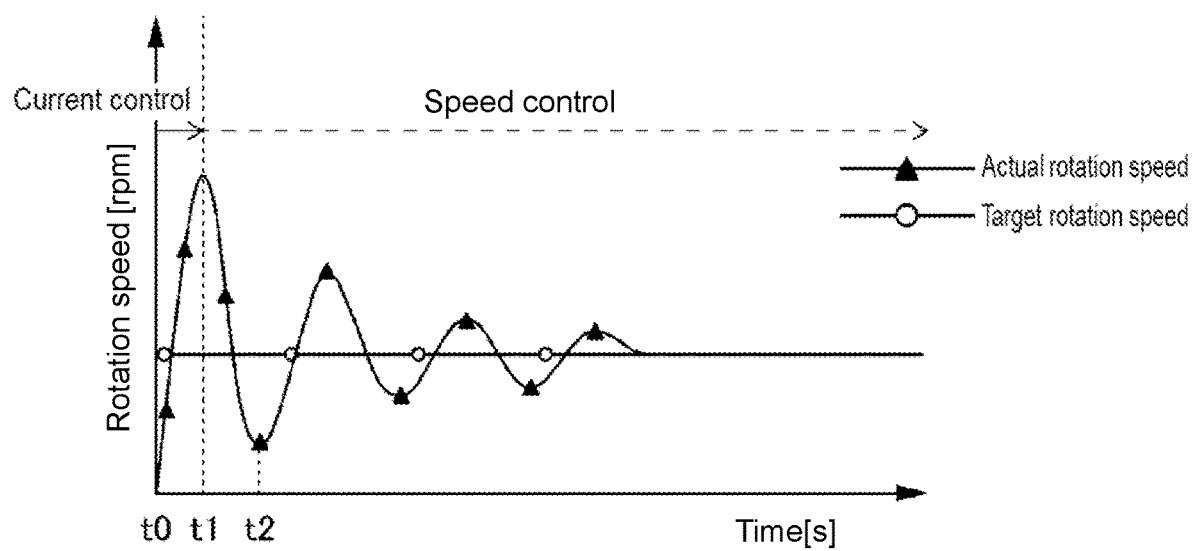
FIG. 7 is a diagram illustrating various waveforms according to a comparative example.
Figure 8:
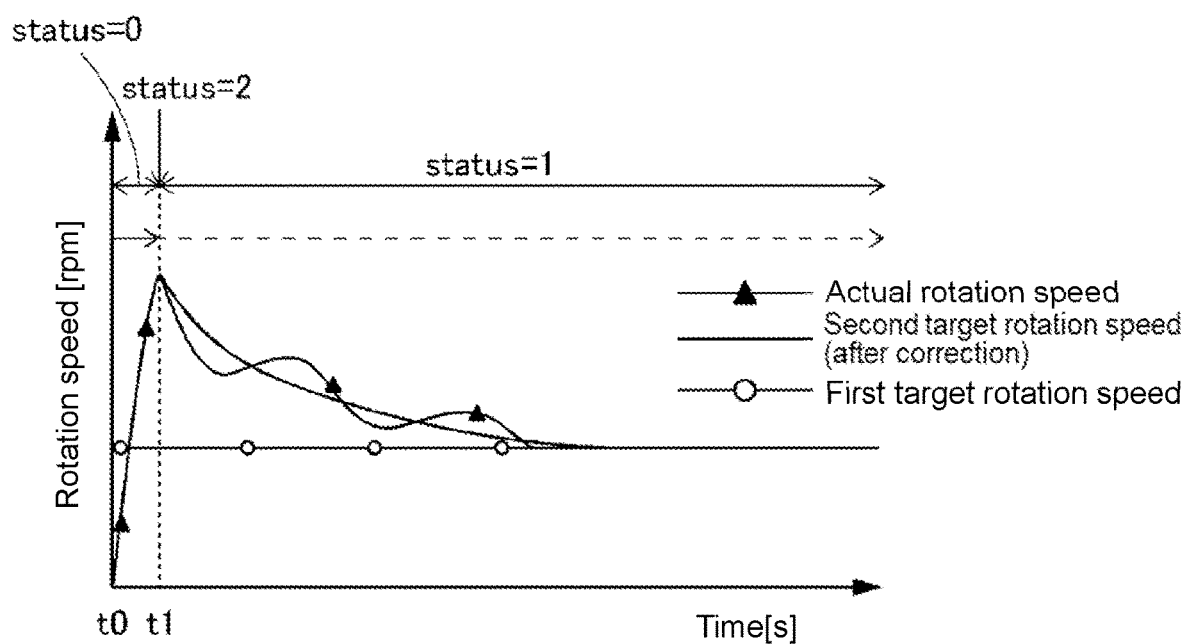
FIG. 8 is a diagram illustrating various waveforms according to an operation example of the motor control device according to the embodiment at the time when a target rotation speed is lower than an actual rotation speed.
Figure 9:
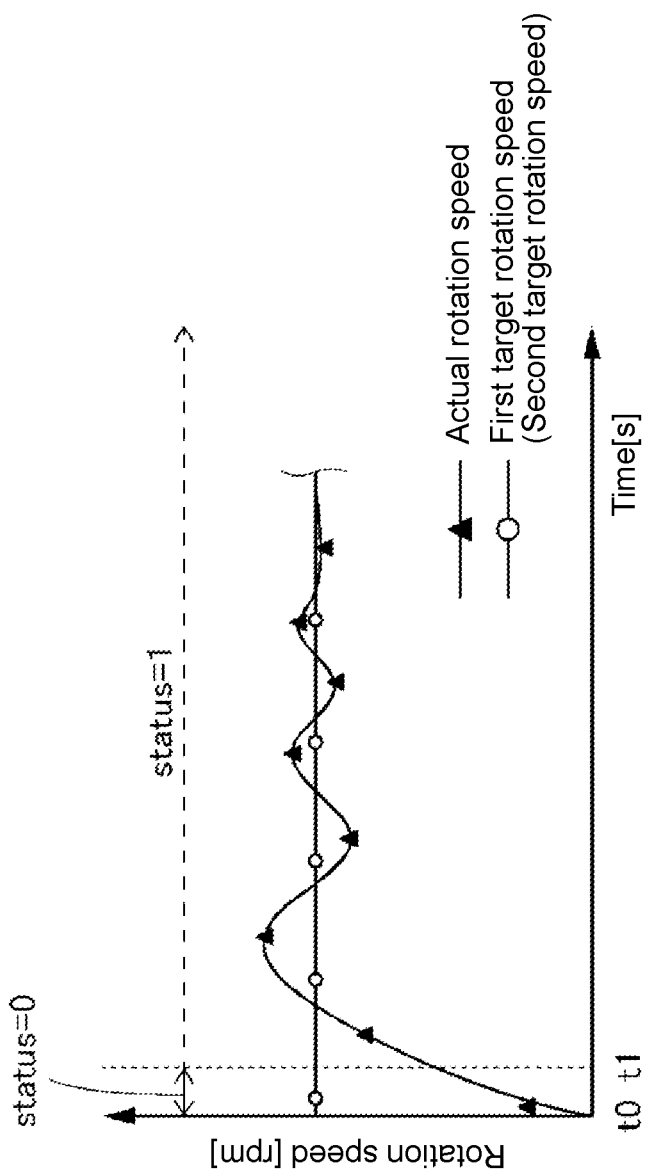
FIG. 9 is a diagram illustrating various waveforms according to an operation example of the motor control device according to the embodiment at the time when the target rotation speed is higher than the actual rotation speed.

Then, with reference to FIGS. 7 to 9, the operation example and the efficacy of the motor control device 10 according to the embodiment are compared with a comparative example.

FIG. 7 is a diagram illustrating the control performed by the comparative example, and FIGS. 8 and 9 are diagrams illustrating the operation example according to the embodiment. FIG. 8 illustrates a case where the correction process is executed, and FIG. 9 illustrates a case where the correction process is not executed. FIGS. 7 to 9 illustrate various waveforms when the horizontal axis is set as time and the vertical axis is set as the rotation speed of the motor 12. Regarding the following description of FIG. 7, the first target rotation speed and the second target rotation speed are set as substantially the same value and referred to as "target rotation speed" without distinction.

The comparative example differs from the embodiment in that the correction process according to the embodiment is not always executed. Therefore, in the comparative example, as shown in FIG. 7, the motor 12 in the stop state is started at a time point t0 under current control, and even though the actual rotation speed significantly exceeds the target rotation speed at a time point t1, speed control is executed based on the target rotation speed without correcting the target rotation speed. As shown in FIG. 7, in such comparative example, when the speed control is started, the actual rotation speed decreases drastically (see the change from the time point t1 to a time point t2 in FIG. 7).

Besides, since the motor 12 drives the hydraulic pressure pump 3 as described above, when the actual rotation speed of the motor 12 becomes relatively high, the hydraulic pressure of the hydraulic pressure pump 3 increases correspondingly. In the state where the hydraulic pressure is relatively high, when the actual rotation speed of the motor 12 decreases drastically, due to the load resulting from the relatively high hydraulic pressure, there is a concern that the desired rotation state of the motor 12 is not realized. As a result, while not occurring in FIG. 7, a situation in which the motor 12 stops may occur.

Comparatively, in the embodiment, the motor 12 in the stop state is started under current control at the time point to, and when the actual rotation speed at the time point t1 significantly exceeds the first target rotation speed, as shown in FIG. 8, the second target rotation speed is corrected to the actual rotation speed according to the correction process. As a result, differing from the comparative example, the actual rotation speed does not decrease drastically, and the issue occurring in the comparative example can be resolved.

In the embodiment, as shown in FIG. 9, in the case where the actual rotation speed at the started time point t1 under the current control is lower than the first target rotation speed, the correction process is not executed, but the speed control based on the first target rotation speed acquired by the target value acquisition part 116 is executed.

In this way, according to the embodiment, when the current control state is transitioned to the speed control state, the correction process is executed only in the case where the first target rotation speed acquired by the target value acquisition part 116 is significantly lower than the actual rotation speed. That is, the correction process is executed only under the condition that the rotation speed of the motor 12 may decrease drastically. Accordingly, the issue which occurs in the case where the correction process is always executed can be resolved. For example, when the second target rotation speed is corrected to match the relatively low actual rotation speed, an issue such as the timing at which the command rotation speed from the superordinate ECU 4 is realized is delayed occurs. However, according to the embodiment, such issue can be resolved.

Although the embodiments of the disclosure have been described in detail with reference to the drawings, the specific configuration is not limited to this embodiment, and includes designs and the like within a range that does not deviate from the gist of the disclosure.

The following will be further disclosed with respect to the embodiment of the disclosure.

An aspect of the disclosure provides a motor control device (10), including: a current control part (112), performing current control for rotating a motor from a stop state; a rotation speed calculation part (114), calculating an actual rotation speed of the motor; an acquisition part (target value acquisition part 116), acquiring a target rotation speed, which is a target value relating a rotation speed of the motor; a speed control part (118), performing speed control of the motor, so that the actual rotation speed of the motor calculated by the rotation speed calculation part becomes the target rotation speed acquired by the acquisition part; and a correction part (120), at a time of a transition from a current control state by the current control part to the speed control performed by the speed control part, correcting the target rotation speed acquired by the acquisition part based on a relation between the actual rotation speed of the motor calculated by the rotation speed calculation part and the target rotation speed acquired by the acquisition part. In a case where the target rotation speed acquired by the acquisition part is corrected by the correction part, the speed control part performs the speed control, so that the actual rotation speed of the motor calculated by the rotation speed calculation part becomes the target rotation speed corrected by the correction part.

According to the above, with the correction part, a motor control device capable of suppressing the drastic decrease in the rotation speed of the motor occurring at the time when the current control state is transitioned to the speed control state can be provided.

According to an embodiment of the disclosure, in a case where the target rotation speed acquired by the acquisition part is lower than the actual rotation speed of the motor calculated by the rotation speed calculation part, the correction part corrects the target rotation speed acquired by the acquisition part toward the actual rotation speed of the motor calculated by the rotation speed calculation part.

According to the embodiment, at the time when the current control state is transitioned to the speed control state, even in the case where the target rotation speed (target rotation speed before correction) is lower than the actual rotation speed of the motor, the drastic decrease in the rotation speed of the motor can be suppressed by correcting the target rotation speed.

According to an embodiment of the disclosure, in the case where the target rotation speed acquired by the acquisition part is lower than the actual rotation speed of the motor calculated by the rotation speed calculation part, the correction part corrects the target rotation speed acquired by the acquisition part to substantially match the actual rotation speed of the motor calculated by the rotation speed calculation part.

According to the embodiment, at the time when the current control state is transitioned to the speed control state, even in the case where the target rotation speed is lower than the actual rotation speed of the motor, the target rotation speed can be properly corrected, and, as a result, the drastic decrease in the rotation speed of the motor can be avoided.

According to an embodiment of the disclosure, in a case where the target rotation speed acquired by the acquisition part is greater than the actual rotation speed of the motor calculated by the rotation speed calculation part, the correction part does not correct the target rotation speed acquired by the acquisition part.

According to the embodiment, at the time when the current control state is transitioned to the speed control state, the rotation speed of the motor is corrected so as not to decrease drastically, while the transition can be realized quickly without correction.

According to an embodiment of the disclosure, the target rotation speed includes a first target rotation speed, which is a command value supplied from a superordinate control device and relating to the rotation speed of the motor, and a second target rotation speed, the acquisition part acquires a current value of the second target rotation speed based on a difference between a current value of the first target rotation speed and a previous value of the second target rotation speed, the speed control part performs the speed control, so that after the transition, the actual rotation speed of the motor becomes the second target rotation speed acquired by the acquisition part, at the time of the transition, the correction part corrects the second target rotation speed based on a relation between the actual rotation speed of the motor calculated by the rotation speed calculation part and the first target rotation speed acquired by the acquisition part, in a case where the second target rotation speed acquired by the acquisition part is corrected by the correction part at the time of the transition, the speed control part performs the speed control, so that the actual rotation speed of the motor calculated by the rotation speed calculation part becomes the second target rotation speed corrected by the correction part, in a case where the second target rotation speed acquired by the acquisition part is not corrected by the correction part at the time of the transition, the speed control part performs the speed control, so that the actual rotation speed of the motor becomes the first target rotation speed acquired by the acquisition part.

According to the embodiment, after the transition, by using the second target rotation speed obtained by filtering, even in the case where a gain of the speed control is set high to facilitate the disturbance response property, the possibility that an overshoot occurs can be suppressed.

According to an embodiment of the disclosure, the current control performed by the current control part includes applying a maximum current within a variable range to the motor.

According to the embodiment, the rise of the rotation speed at the time of starting the motor (favorable startability) can be facilitated.

According to an embodiment of the disclosure, the motor is for use of a hydraulic pressure pump (3).

According to the embodiment, at the time when the current control state is transitioned to the speed control state, even in the case of using a hydraulic pressure pump where the load of the motor tends to be relatively large, the possibility that the motor is stopped due to the relatively large load can be decreased.

Another aspect of the disclosure provides a motor driving system (2), including: a motor (12); and a motor control device (10), controlling the motor. The motor control device includes: a current control part (112), performing current control for rotating the motor from a stop state; a rotation speed calculation part (114), calculating an actual rotation speed of the motor; an acquisition part (target value acquisition part 116), acquiring a target rotation speed, which is a target value relating a rotation speed of the motor; a speed control part (118), performing speed control of the motor, so that the actual rotation speed of the motor calculated by the rotation speed calculation part becomes the target rotation speed acquired by the acquisition part; and a correction part (120), at a time of a transition from a current control state by the current control part to the speed control performed by the speed control part, correcting the target rotation speed acquired by the acquisition part based on a relation between the actual rotation speed of the motor calculated by the rotation speed calculation part and the target rotation speed acquired by the acquisition part. In a case where the target rotation speed acquired by the acquisition part is corrected by the correction part, the speed control part performs the speed control, so that the actual rotation speed of the motor calculated by the rotation speed calculation part becomes the target rotation speed corrected by the correction part.

According to the above, with the correction part, a motor driving system capable of suppressing the drastic decrease in the rotation speed of the motor occurring at the time when the current control state is transitioned to the speed control state can be provided.

Another aspect of the disclosure provides a hydraulic pressure generation device (1), including: a hydraulic pressure pump (3); a motor (12), driving the hydraulic pressure pump; and a motor control device (10), controlling the motor. The motor control device includes: a current control part (112), performing current control for rotating the motor from a stop state; a rotation speed calculation part (114), calculating an actual rotation speed of the motor; an acquisition part (target value acquisition part 116), acquiring a target rotation speed, which is a target value relating a rotation speed of the motor; a speed control part (118), performing speed control of the motor, so that the actual rotation speed of the motor calculated by the rotation speed calculation part becomes the target rotation speed acquired by the acquisition part; and a correction part (120), at a time of a transition from a current control state by the current control part to the speed control performed by the speed control part, correcting the target rotation speed acquired by the acquisition part based on a relation between the actual rotation speed of the motor calculated by the rotation speed calculation part and the target rotation speed acquired by the acquisition part. In a case where the target rotation speed acquired by the acquisition part is corrected by the correction part, the speed control part performs the speed control, so that the actual rotation speed of the motor calculated by the rotation speed calculation part becomes the target rotation speed corrected by the correction part.

According to the above, with the correction part, a hydraulic pressure generation device capable of suppressing the drastic decrease in the rotation speed of the motor occurring at the time when the current control state is transitioned to the speed control state can be provided.

Another aspect of the disclosure provides a motor control method, including: a current control step of performing current control for rotating a motor from a stop state; a rotation speed calculation step of calculating an actual rotation speed of the motor; an acquisition step of acquiring a target rotation speed, which is a target value relating a rotation speed of the motor; a speed control step of performing speed control of the motor, so that the actual rotation speed of the motor calculated in the rotation speed calculation step becomes the target rotation speed acquired in the acquisition step; and a correction step of correcting, at a time of a transition from a current control state in the current control step to the speed control performed in the speed control step, the target rotation speed acquired in the acquisition step based on a relation between the actual rotation speed of the motor calculated in the rotation speed calculation step and the target rotation speed acquired in the acquisition step. In the speed control step, in a case where the target rotation speed acquired in the acquisition step is corrected by the correction step, the speed control is performed, so that the actual rotation speed of the motor calculated in the rotation speed calculation step becomes the target rotation speed corrected in the correction step.

According to the above, with the correction step, a motor control method capable of suppressing the drastic decrease in the rotation speed of the motor occurring at the time when the current control state is transitioned to the speed control state can be provided.

Another aspect of the disclosure provides a computer-readable medium, storing a motor control program causing a computer to execute: a current control process of performing current control for rotating a motor from a stop state; a rotation speed calculation process of calculating an actual rotation speed of the motor; an acquisition process acquiring a target rotation speed, which is a target value relating a rotation speed of the motor; a speed control process of performing speed control of the motor, so that the actual rotation speed of the motor calculated in the rotation speed calculation process becomes the target rotation speed acquired in the acquisition process; and a correction process of correcting, at a time of a transition from a current control state performed in the current control process to the speed control performed in the speed control process, the target rotation speed acquired in the acquisition process based on a relation between the actual rotation speed of the motor calculated in the rotation speed calculation process and the target rotation speed acquired in the acquisition process. In the speed control process, in a case where the target rotation speed acquired in the acquisition process is corrected by the correction process, the speed control is performed, so that the actual rotation speed of the motor calculated in the rotation speed calculation process becomes the target rotation speed corrected in the correction process.

According to the above, with the correction process, a computer-readable medium storing a motor control program capable of suppressing the drastic decrease in the rotation speed of the motor occurring at the time when the current control state is transitioned to the speed control state can be provided.

What is claimed is:
1. A motor control device, comprising:
  a current control part, performing current control for rotating a motor from a stop state;
    a rotation speed calculation part, calculating an actual rotation speed of the motor;
    an acquisition part, acquiring a target rotation speed, which is a target value relating a rotation speed of the motor;

a speed control part, performing speed control of the motor, so that the actual rotation speed of the motor calculated by the rotation speed calculation part becomes the target rotation speed acquired by the acquisition part; and a correction part, at a time of a transition from a current control state by the current control part to the speed control performed by the speed control part, correcting the target rotation speed acquired by the acquisition part based on a relation between the actual rotation speed of the motor calculated by the rotation speed calculation part and the target rotation speed acquired by the acquisition part, wherein in a case where the target rotation speed acquired by the acquisition part is corrected by the correction part, the speed control part performs the speed control, so that the actual rotation speed of the motor calculated by the rotation speed calculation part becomes the target rotation speed corrected by the correction part.

2. The motor control device as claimed in claim 1, wherein in a case where the target rotation speed acquired by the acquisition part is lower than the actual rotation speed of the motor calculated by the rotation speed calculation part, the correction part corrects the target rotation speed acquired by the acquisition part toward the actual rotation speed of the motor calculated by the rotation speed calculation part.

3. The motor control device as claimed in claim 2, wherein in the case where the target rotation speed acquired by the acquisition part is lower than the actual rotation speed of the motor calculated by the rotation speed calculation part, the correction part corrects the target rotation speed acquired by the acquisition part to substantially match the actual rotation speed of the motor calculated by the rotation speed calculation part.

4. The motor control device as claimed in claim 1, wherein in a case where the target rotation speed acquired by the acquisition part is greater than the actual rotation speed of the motor calculated by the rotation speed calculation part, the correction part does not correct the target rotation speed acquired by the acquisition part.

5. The motor control device as claimed in claim 1, wherein the target rotation speed comprises a first target rotation speed, which is a command value supplied from a superordinate control device and relating to the rotation speed of the motor, and a second target rotation speed, the acquisition part acquires a current value of the second target rotation speed based on a difference between a current value of the first target rotation speed and a previous value of the second target rotation speed, the speed control part performs the speed control, so that after the transition, the actual rotation speed of the motor becomes the second target rotation speed acquired by the acquisition part, at the time of the transition, the correction part corrects the second target rotation speed based on a relation between the actual rotation speed of the motor calculated by the rotation speed calculation part and the first target rotation speed acquired by the acquisition part, in a case where the second target rotation speed acquired by the acquisition part is corrected by the correction part at the time of the transition, the speed control part performs the speed control, so that the actual rotation speed of the motor calculated by the rotation speed calculation part becomes the second target rotation speed corrected by the correction part, in a case where the second target rotation speed acquired by the acquisition part is not corrected by the correction part at the time of the transition, the speed control part performs the speed control, so that the actual rotation speed of the motor becomes the first target rotation speed acquired by the acquisition part.

6. The motor control device as claimed in claim 1, wherein the current control performed by the current control part comprises applying a maximum current within a variable range to the motor.

7. The motor control device as claimed in claim 1, wherein the motor is for use of a hydraulic pressure pump.

8. A hydraulic pressure generation device, comprising:
a hydraulic pressure pump;
a motor, driving the hydraulic pressure pump; and
a motor control device, controlling the motor,
wherein the motor control device comprises:
a current control part, performing current control for rotating the motor from a stop state;
a rotation speed calculation part, calculating an actual rotation speed of the motor;
an acquisition part, acquiring a target rotation speed, which is a target value relating a rotation speed of the motor;
a speed control part, performing speed control of the motor, so that the actual rotation speed of the motor calculated by the rotation speed calculation part becomes the target rotation speed acquired by the acquisition part; and
a correction part, at a time of a transition from a current control state by the current control part to the speed control performed by the speed control part, correcting the target rotation speed acquired by the acquisition part based on a relation between the actual rotation speed of the motor calculated by the rotation speed calculation part and the target rotation speed acquired by the acquisition part,
wherein in a case where the target rotation speed acquired by the acquisition part is corrected by the correction part, the speed control part performs the speed control, so that the actual rotation speed of the motor calculated by the rotation speed calculation part becomes the target rotation speed corrected by the correction part.

9. A motor control method, comprising:
a current control step of performing current control for rotating a motor from a stop state;
a rotation speed calculation step of calculating an actual rotation speed of the motor;
an acquisition step of acquiring a target rotation speed, which is a target value relating a rotation speed of the motor;
a speed control step of performing speed control of the motor, so that the actual rotation speed of the motor calculated in the rotation speed calculation step becomes the target rotation speed acquired in the acquisition step; and
a correction step of correcting, at a time of a transition from a current control state in the current control step to the speed control performed in the speed control step, the target rotation speed acquired in the acquisition step based on a relation between the actual rotation speed of the motor calculated in the rotation speed calculation step and the target rotation speed acquired in the acquisition step,
wherein in the speed control step, in a case where the target rotation speed acquired in the acquisition step is corrected by the correction step, the speed control is performed, so that the actual rotation speed of the motor calculated in the rotation speed calculation step becomes the target rotation speed corrected in the correction step.

10. A computer-readable recording medium, storing a motor control program causing a computer to execute:
- a current control process of performing current control for rotating a motor from a stop state;
- a rotation speed calculation process of calculating an actual rotation speed of the motor;
- an acquisition process acquiring a target rotation speed, which is a target value relating a rotation speed of the motor;
- a speed control process of performing speed control of the motor, so that the actual rotation speed of the motor calculated in the rotation speed calculation process becomes the target rotation speed acquired in the acquisition process; and
- a correction process of correcting, at a time of a transition from a current control state performed in the current control process to the speed control performed in the speed control process, the target rotation speed acquired in the acquisition process based on a relation between the actual rotation speed of the motor calculated in the rotation speed calculation process and the target rotation speed acquired in the acquisition process, wherein in the speed control process, in a case where the target rotation speed acquired in the acquisition process is corrected by the correction process, the speed control is performed, so that the actual rotation speed of the motor calculated in the rotation speed calculation process becomes the target rotation speed corrected in the correction process.

* * * * *